US006594828B1

(12) United States Patent
Moss

(10) Patent No.: US 6,594,828 B1
(45) Date of Patent: Jul. 15, 2003

(54) EXTENDER FOR TRANSMITTING AN ENHANCED SIGNAL BETWEEN A COMPUTER SYSTEM AND A COMPUTER MONITOR

(75) Inventor: Daniel D. Moss, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/166,422

(22) Filed: Oct. 5, 1998

(51) Int. Cl.[7] .............................. H04N 7/20; H04N 7/16

(52) U.S. Cl. .......................... 725/136; 725/69; 725/136; 725/141; 345/600

(58) Field of Search .............................. 725/69, 70, 71, 725/133, 136, 141, 153; 348/488, 492, 496; 345/589, 600, 603, 604

(56) References Cited

U.S. PATENT DOCUMENTS 5,268,676 A * 12/1993 Asprey et al.
5,299,306 A * 3/1994 Asprey
5,309,564 A * 5/1994 Bradley et al.
5,486,929 A * 1/1996 Heyl
5,508,812 A * 4/1996 Stevenson et al.
5,621,535 A * 4/1997 Heyl
5,793,367 A * 8/1998 Taguchi
6,057,889 A * 5/2000 Reitmeier et al.

* cited by examiner

*Primary Examiner*—Andrew Faile
*Assistant Examiner*—Kieu-Oanh Bui
(74) *Attorney, Agent, or Firm*—Kenyon & Kenyon

(57) ABSTRACT

An extender transmits red, blue and green signals, and vertical and horizontal sync signals over a single transmission medium. The extender generates a subcarrier reference frequency signal from the vertical and horizontal sync signals and combines the subcarrier reference frequency signal with the vertical and horizontal sync signals and the green signal to generate a green portion. The extender then quadrature amplitude modulates the blue signal and the red signal by the subcarrier reference frequency signal to generate a color portion, and combines the green portion and the color portion to generate an enhanced video signal. The enhanced video signal is transmitted over the single transmission medium.

23 Claims, 9 Drawing Sheets

EXTENDER FOR TRANSMITTING AN ENHANCED SIGNAL BETWEEN A COMPUTER SYSTEM AND A COMPUTER MONITOR

FIELD OF THE INVENTION

The present invention is directed to a computer system and a computer monitor. More particularly, the present invention is directed to an extender for transmitting an enhanced video signal and increasing the distance between a computer system and a computer monitor.

BACKGROUND OF THE INVENTION

Computer systems typically include a computer graphics controller or some other graphics or video generator that outputs analog red, green and blue ("RGB") video signals. The RGB signals are sent to a computer monitor where they are displayed. The cable coupling the RGB signals to the computer monitor from a computer system requires three separate wires, one for each RGB signal. Further, an additional two wires are sometimes required for horizontal and vertical synchronization signals.

There may be a need to extend the distance between a computer system and a computer monitor. For example, it may be desirable to have the computer system in one room and the computer monitor in another room. One known way of accomplishing this is to have three RGB wires and two horizontal and vertical synchronization wires extending between the rooms. However, extending five separate wires can be costly and difficult, especially if more than one room requires a monitor.

Another known way of extending the distance between a computer system and computer monitor is to encode the RGB signal into a single National Television Standards Committee ("NTSC") composite television signal using a YUV color space format. The television signal can be transmitted, for example, in a known manner on a coaxial cable. Thus, only one extended wire needs to be installed between the computer system and computer monitor. However, when an NTSC YUV signal is decoded back into an RGB signal for display on a computer monitor, the color quality and sharpness of the resultant RGB image is substantially lower than the original RGB image.

Based on the foregoing, there is a need for a method and apparatus for more easily transmitting an RGB signal over an extended distance while maintaining the quality of the signal.

SUMMARY OF THE INVENTION

One embodiment of the present invention is an extender that transmits red, blue and green signals, and vertical and horizontal sync signals. The extender generates a subcarrier reference frequency signal from the vertical and horizontal sync signals and combines the subcarrier reference frequency signal with the vertical and horizontal sync signals and the green signal to generate a green portion. The extender then quadrature amplitude modulates the blue signal and the red signal by the subcarrier reference frequency signal to generate a color portion, and combines the green portion and the color portion to generate an enhanced video signal.

DETAILED DESCRIPTION

Figure 1:
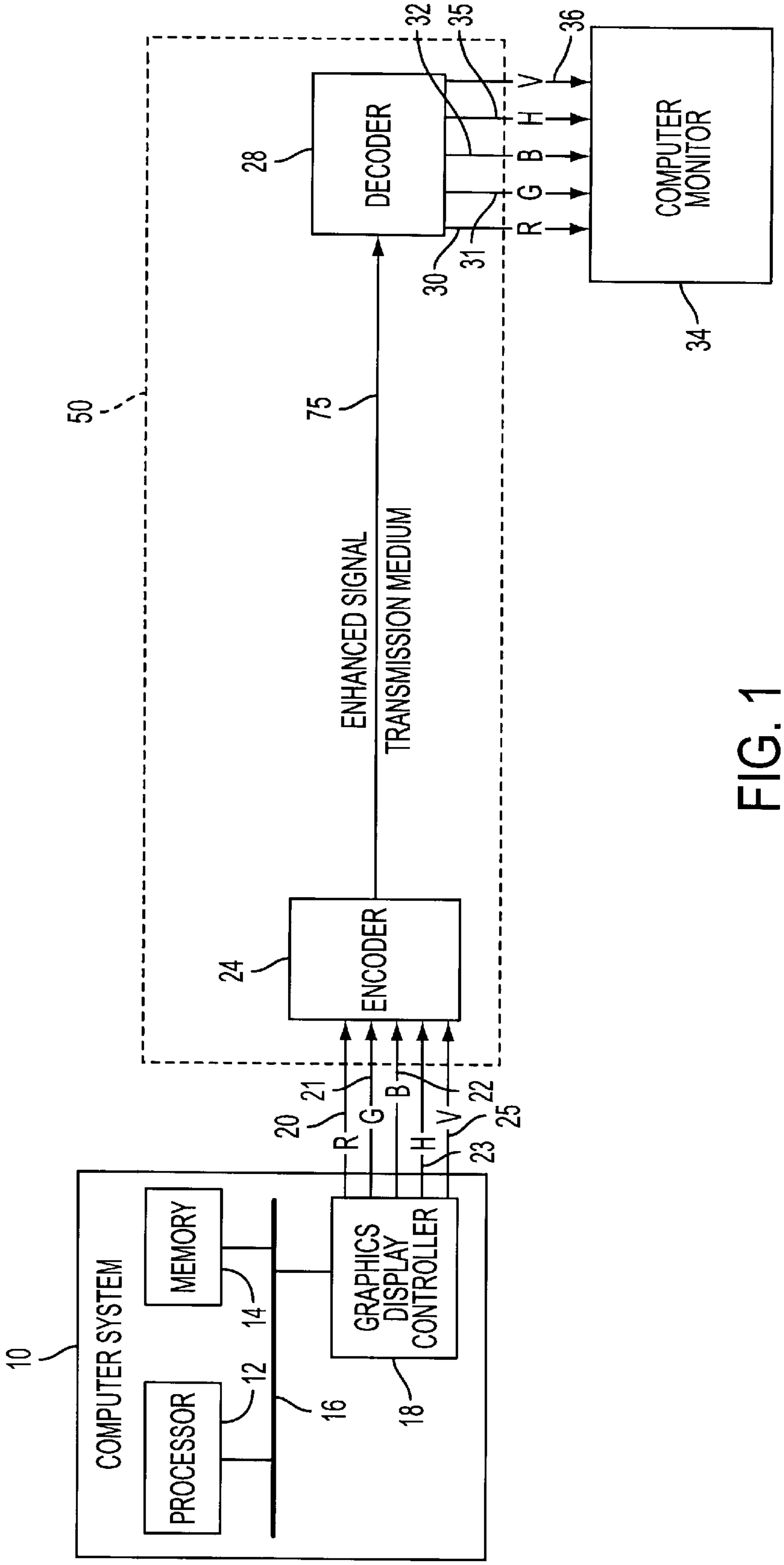
FIG. 1 is a block diagram of a distance extender coupled to a computer system and a computer monitor in accordance with one embodiment of the present invention.

FIG. 1 is a block diagram of a distance extender coupled to a computer system and a computer monitor in accordance with one embodiment of the present invention.

The computer system 10 includes a bus 16. Coupled to bus 16 is a processor 12, a memory device 14 and a graphics display controller 18. Graphics display controller 18 outputs red, green and blue ("RGB") analog video signals 20–22 on three outputs in a known manner. Horizontal synchronization ("sync") pulses 23 and vertical sync pulses 25 for the RGB signal are also output by graphics display controller 18.

The distance extender 50 includes an encoder 24 that is coupled to RGB outputs 20–22 and horizontal and vertical sync outputs 23 and 25. Encoder 24 encodes the input signals into an "enhanced video signal" 75. Enhanced signal 75 is transmitted on a single transmission medium. Therefore, enhanced signal 75 does not require, for example, five wires to be transmitted. In one embodiment, the transmission medium is a single-conductor shielded coaxial cable such as a standard television cable that is already installed in many homes and businesses. However, the transmission medium can be any medium that can transmit approximately 60 MHz of bandwidth, including a wireless radio frequency ("RF") connection.

Distance extender 50 further includes a decoder 28 coupled to the transmission medium that carries enhanced video signal 75. Decoder 28 receives enhanced video signal 75 and decodes the signal into an RGB signal 30–32 and horizontal and vertical sync signals 35 and 36. Decoder 28 is coupled to a computer monitor 34. Computer monitor 34 receives the decoded RGB signals 30–32 and horizontal and vertical sync signals 35 and 36 from decoder 28 and displays the signals in a known manner.

Figure 2:
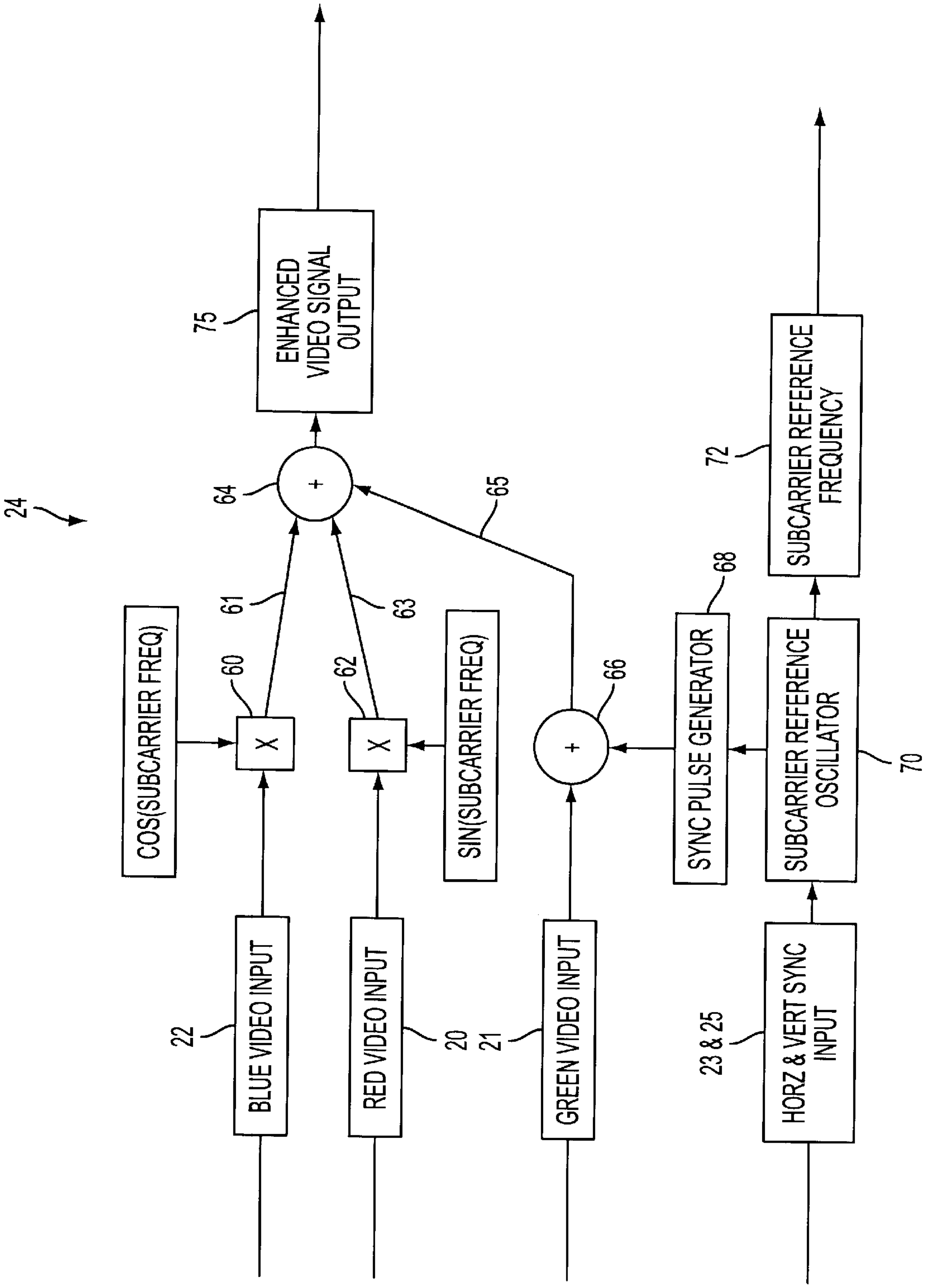
FIG. 2 is a detailed block diagram of an encoder in accordance with one embodiment of the present invention.

FIG. 2 is a detailed block diagram of encoder 24 in accordance with one embodiment of the present invention. Encoder 24 receives as inputs the red, green, and blue analog video signals 20–22 and the horizontal and vertical sync signals 23 and 25 from graphics display controller 18. Horizontal and vertical sync signals 23 and 25 are input to a subcarrier reference oscillator circuit 70. Subcarrier reference oscillator circuit 70 determines the horizontal and vertical display resolution of the RGB video input signals 20–22. Subcarrier reference oscillator circuit 70 further generates a subcarrier reference frequency 72 signal. Subcarrier reference frequency 72 is used to encode and decode red and blue signals 20 and 22.

Subcarrier reference oscillator circuit 70 outputs horizontal and vertical sync signals 23 and 25 and subcarrier reference frequency 72 to a sync pulse generator circuit 68 where the signals are combined. An adder 66 then combines the output of sync pulse generator circuit 68 with the input green analog video signal 21.

Mixers 60 and 62 are used to generate a Quadrature Amplitude Modulation ("QAM") encoded red and blue color signal. Red analog video signal 20 is analog multiplied by the sine of subcarrier reference frequency 72 in mixer 62. Blue analog video signal 22 is multiplied by the cosine of subcarrier reference frequency 72 in mixer 60. The two resulting red and blue analog signals 61 and 63 from mixers 60 and 62 are summed with the green signal 65 from adder 66 in an adder 64 to generate enhanced video signal 75.

Enhanced video signal 75 does not specify a fixed horizontal and vertical scan frequency or a fixed subcarrier reference frequency. Therefore, enhanced video signal 75 can accommodate a wide range of display resolutions, including the commonly used computer graphics display resolutions and the various high-definition television display resolutions. Encoder 24 accommodates several different display resolutions by changing subcarrier reference frequency 72 based on the horizontal and vertical sync input pulses. Subcarrier reference oscillator circuit 70 detects the horizontal sync pulse input frequency and sets subcarrier reference frequency 72 based on a table of predetermined values.

Figure 3:
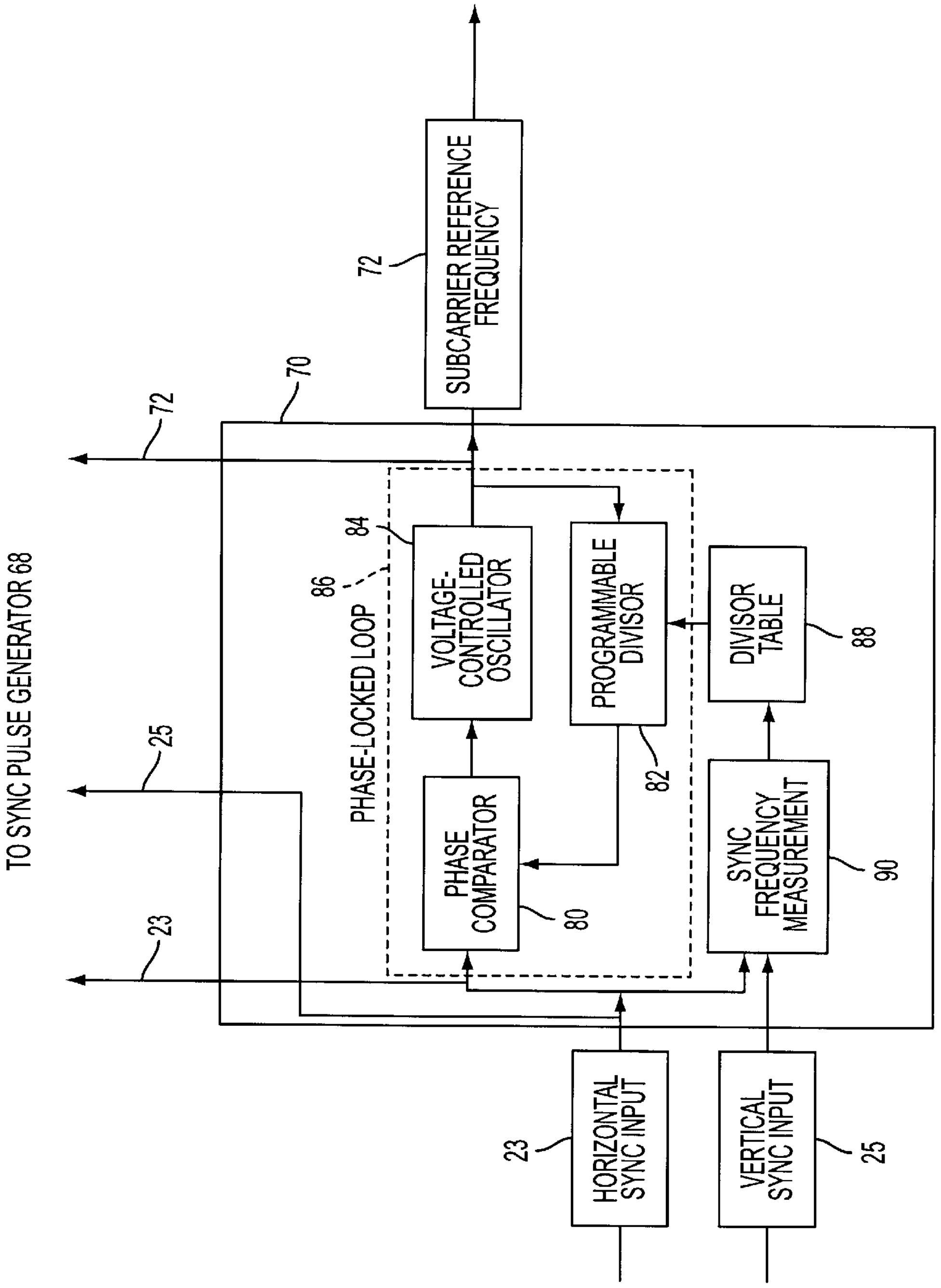
FIG. 3 is a detailed block diagram of a subcarrier reference oscillator circuit.

FIG. 3 is a detailed block diagram of subcarrier reference oscillator circuit 70. Subcarrier reference oscillator circuit 70 includes a programmable phase-locked loop ("PLL") 86. PLL 86 includes a phase comparator 80, a voltage-controlled oscillator 84 and a programmable divisor 82. Coupled to PLL 86 is a sync frequency measurement device 90 and a divisor table 88.

Subcarrier reference oscillator circuit 70 uses horizontal sync input 23 to determine both the programmable divisor 82 values as well as maintain a stable phase relationship between subcarrier reference frequency 72 and horizontal sync input 23. In operation, sync frequency measurement device 90 determines the frequency of both the horizontal and the vertical sync inputs 23 and 25 by using a standard period counter circuit. The horizontal and vertical sync frequencies indicate the resolution of the incoming video image. Sync frequency measurement circuit 90 selects a divisor value from divisor table 88 which includes a table of pre-determined values. Each divisor value in divisor table 88 is associated with one or more specific display resolutions. A subcarrier reference frequency is associated with each divisor value. Table 1 below provides an example of some values stored in divisor table 88.

TABLE 1

Subcarrier reference oscillator 72 example programmable divisor values.

| Display Resolution | Horz. Sync Freq. | Subcarrier Ref. Freq. | PLL Divisor Value |
|---|---|---|---|
| 1920 × 1080 pixels | 33.75 KHz | 55.68 MHZ | 1650 |
| 1280 × 720 pixels | 22.50 KHz | 27.84 MHZ | 1238 |
| 640 × 480 pixels | 15.73 KHz | 10.12 MHZ | 644 |

Figure 4:
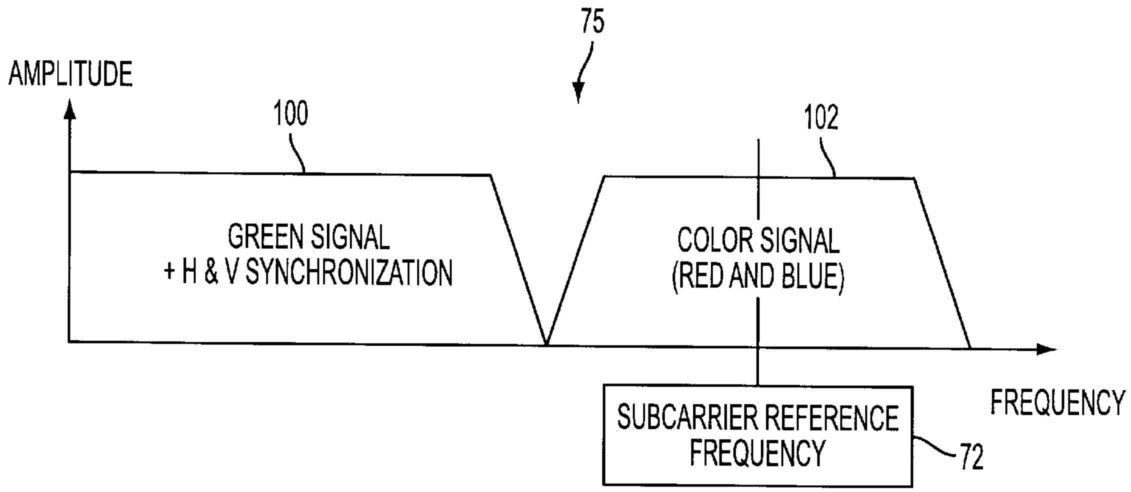
FIG. 4 is a frequency spectrum of one embodiment of an enhanced signal.

FIG. 4 is a frequency spectrum of one embodiment of enhanced signal 75. Enhanced signal 75 is based on red, green, and blue analog video components. Based on research of the human vision system which shows that the human eye is far more sensitive to the color green than the colors red and blue, the format of enhanced signal 75 allocates most of its spectral bandwidth to the green signal with the red and blue signals being combined together using QAM.

Enhanced signal 75 includes a green signal portion 100 and color signal portion 102. Green signal portion 100 includes horizontal sync pulses (one pulse per video scan line), vertical sync pulses (one pulse per video field), subcarrier reference frequency 72 that is used to demodulate the red and blue QAM encoded video signals, and the analog video information representing the green color portion of the visual image. Color signal portion 102 includes analog video information representing the red and blue color portion of the visual image. Color signal portion 102 is centered around subcarrier reference frequency 72.

Figure 5:
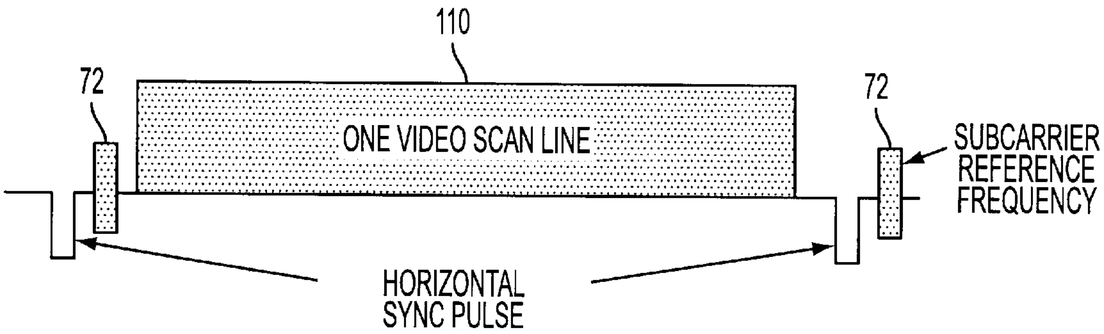
FIG. 5 illustrates in detail a horizontal video scan line of a green signal portion of the enhanced signal.

FIG. 5 illustrates in detail a horizontal video scan line 110 of green signal portion 100 of enhanced signal 75. As shown, at the beginning of each horizontal scan line 110 is a horizontal sync pulse and a burst of subcarrier reference frequency 72.

Figure 6:
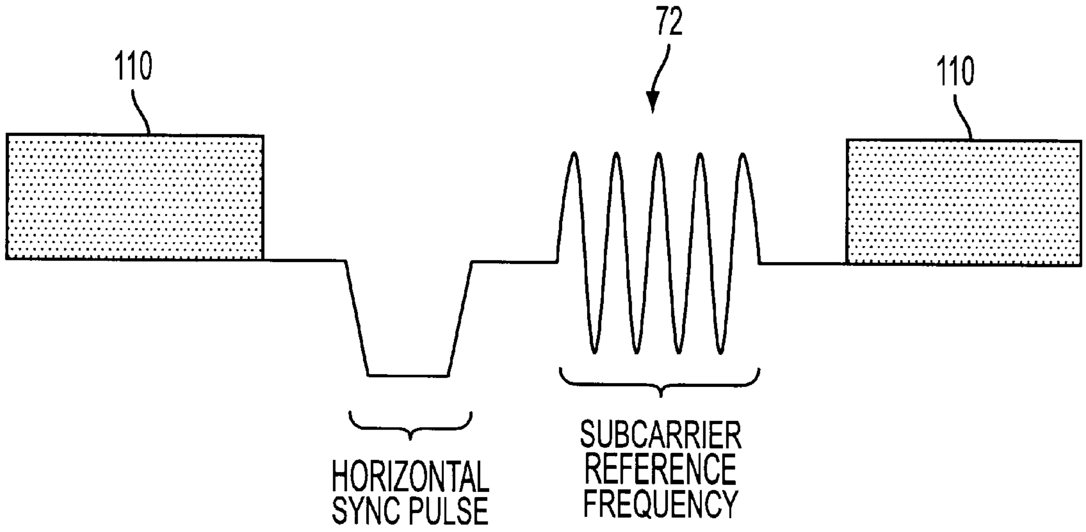
FIG. 6 illustrates in detail a horizonal sync pulse and a subcarrier reference frequency.

FIG. 6 illustrates in detail a horizonal sync pulse and subcarrier reference frequency 72. The horizontal sync pulse defines the end of one video scan line 110 and the beginning of the next scan line 110. The burst of subcarrier reference frequency 72 signal is comprised of multiple, sinusoidal cycles of the subcarrier reference frequency.

Figure 7:
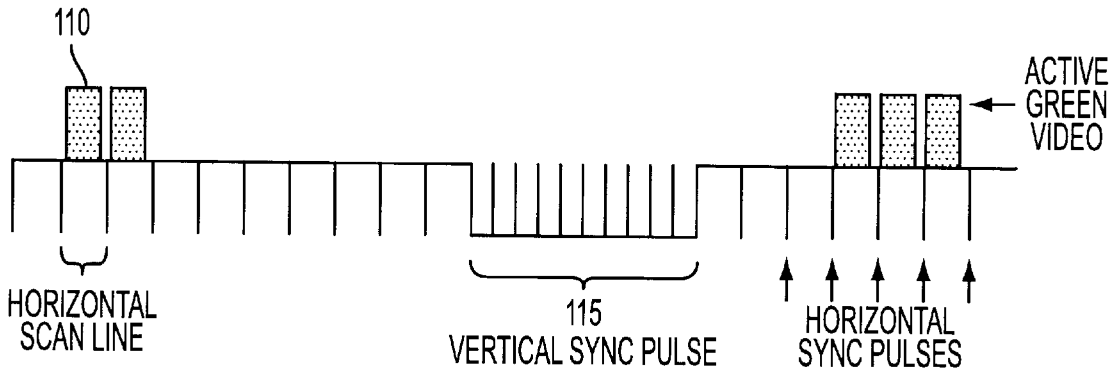
FIG. 7 illustrates a vertical sync pulse of the green signal portion of the enhanced signal in relation to the horizontal sync pulses.

FIG. 7 illustrates a vertical sync pulse 115 of green signal portion 100 of enhanced signal 75 in relation to the horizontal sync pulses. The vertical sync pulse 115 indicates to computer monitor 34 the end of one complete frame of video information and the beginning of the next frame, where each video frame is comprised of multiple, individual, horizontal video scan lines 110. The actual number of horizontal scan lines in a video frame and the number of frames displayed per second are not fixed numbers. Therefore, enhanced signal 75 can support a wide range of display resolutions and frame rates. The pulses within the Vertical Sync Pulse 115 select if enhanced signal 75 is in an interlaced or a non-interlaced display format.

Color signal portion 102 shown in the frequency spectrum of FIG. 4 contains the analog video information representing the red and the blue color portions of the visual image. The red and blue signals are combined using QAM in order to reduce the overall signal bandwidth requirements. QAM encoding requires that both the signal source and the signal receiver use a common subcarrier frequency. In enhanced signal 75, multiple cycles of subcarrier reference frequency 72 are included at the beginning of each active horizontal scan line in the green signal as shown in FIG. 6. Decoder 28 captures this burst of the subcarrier reference frequency 72 and uses it to maintain decoder's 28 local subcarrier oscillator in the correct frequency and phase relationship with encoder's 24 subcarrier oscillator, thus allowing the proper demodulation of the QAM red and blue signals by decoder 28.

Figure 8:
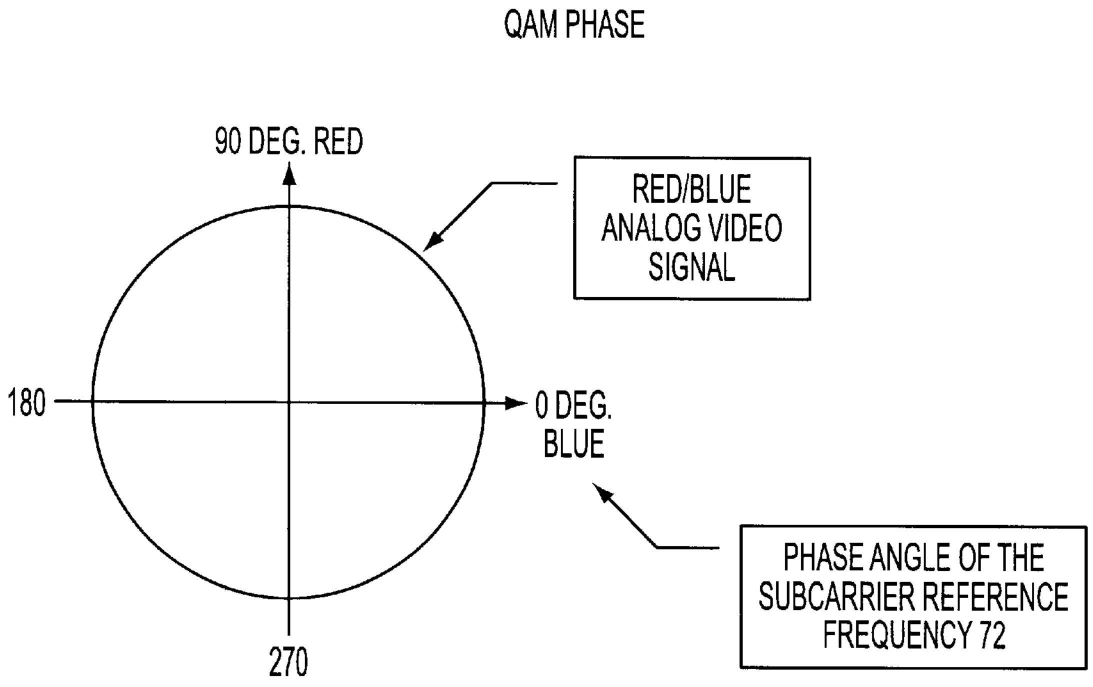
FIG. 8 illustrates the QAM phase relationship between the red and blue analog video signals.

QAM encoding of the red and blue analog video signals 20 and 22 can be viewed as a form of multiplexing so that the red and blue signals can occupy the same frequency spectrum at the same time. This multiplexing is controlled by the phase of subcarrier reference frequency 72 signal. FIG. 8 illustrates the QAM phase relationship between the red and blue analog video signals. When subcarrier reference frequency 72 is at 0 or 180 degrees, then the amplitude of the blue analog video signal is valid. When the subcarrier reference signal is at 90 or 270 degrees, then the amplitude of the red video signal is valid. The analog amplitude of color signal portion 102 at these specific phase points of subcarrier reference frequency 72 directly represents the amplitude of the red or of the blue video signals. For example, if the color signal portion 102 amplitude is 0.5 when the subcarrier reference signal 72 phase is 0 degrees, then the amplitude of the blue output video signal is also 0.5.

Figure 9:
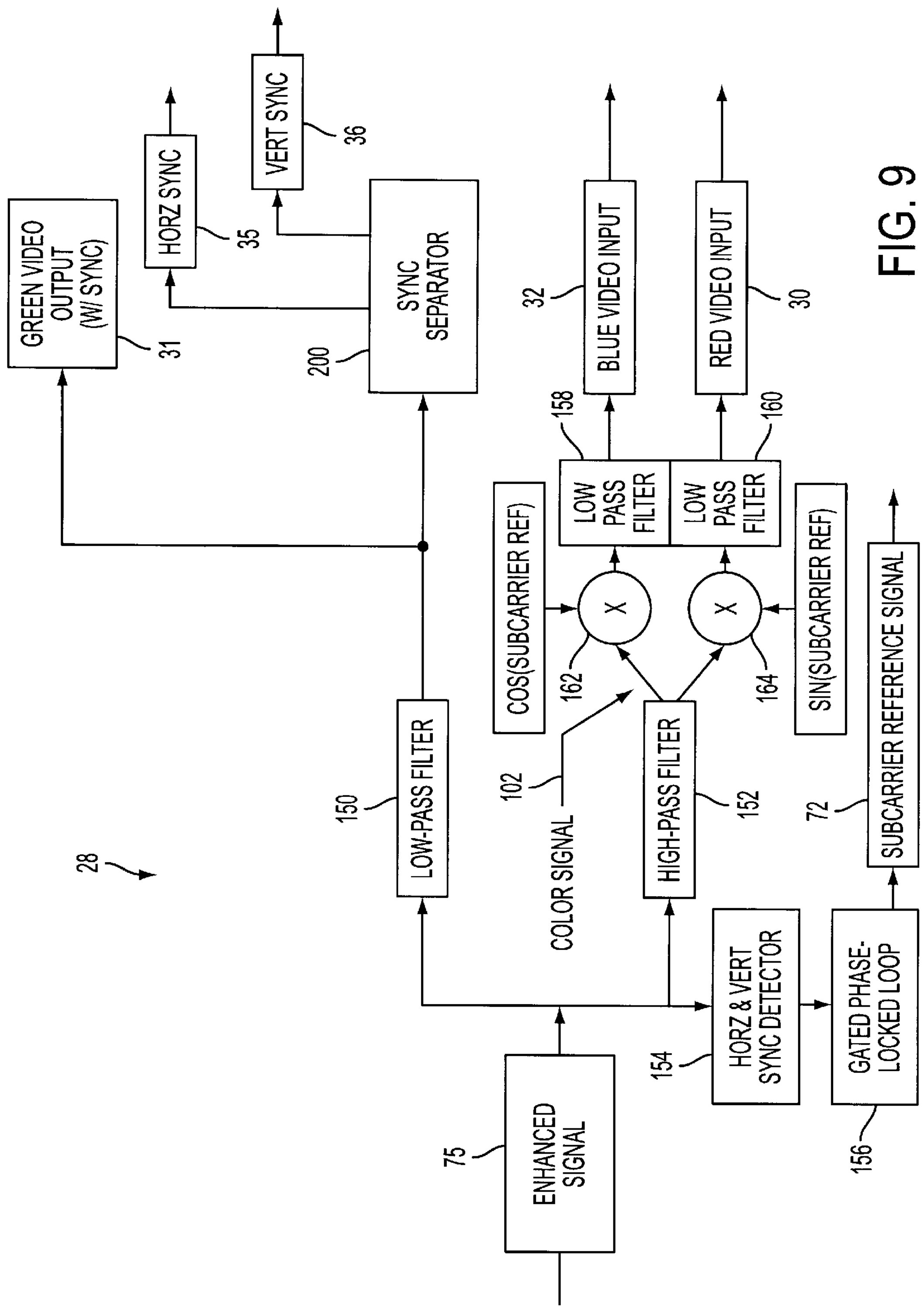
FIG. 9 is a detailed block diagram of a decoder in accordance with one embodiment of the present invention.

Decoder 28 reverses the operations of encoder 24 to recover the original analog red, green, and blue video signals 20–22. FIG. 9 is a detailed block diagram of decoder 28 in accordance with one embodiment of the present invention.

Decoder 28 receives as an input enhanced signal 75. A horizontal and vertical sync detector 154 extracts the horizontal and vertical sync signals plus the subcarrier reference burst from the enhanced signal 75. As shown in FIG. 6, subcarrier reference frequency 72 signal is present only during the horizontal sync portion of each video scan line and it is not present during the actual color signal portion of the horizontal scan line. Decoder 28 must maintain its own "copy" of encoder's 24 subcarrier reference frequency signal in order to perform the QAM demodulation of the color signal. Decoder's 28 subcarrier reference signal must be an exact match in both frequency and phase to encoder's 24 subcarrier reference signal. This is done by using a gated phase-locked loop circuit 156. The burst of subcarrier reference signals from the horizontal sync portion of the input video scan lines is gated into phase-locked locked loop circuit 156. Phase-locked loop 156 then maintains the frequency and phase of subcarrier reference signal 72 for QAM demodulation of the red and blue signals.

The QAM-encoded color signal portion 102 is next separated from green signal portion 100. This operation is performed with a low pass filter 150 and a high pass filter 152 because color signal portion 102 is positioned spectrally above green signal portion 100. Low-pass filter 150 removes color signal portion 102 while retaining the green signal portion of enhanced signal 75. Conversely, high pass filter 152 retains color signal portion 102 while removing green signal portion 100. The cut-off frequency of both low-pass 150 and high-pass filter 152 is adjustable, depending on subcarrier reference frequency 72. Specifically, in one embodiment the filter cut-off frequency is set to ⅔ of subcarrier reference frequency 72. This allocates 50% of the total signal bandwidth to green signal portion 100 and 50% of the bandwidth to color signal portion 102.

The green video output 31 which includes the horizontal and vertical sync pulses is output from low-pass filter 150. Horizontal sync signal 35 and vertical sync signal 36 are separated from green signal portion 100 by a sync separator 200. Color signal portion 102 is separated into its component red and blue video components using QAM demodulation. The QAM demodulation uses the sine and cosine values of decoder's 28 subcarrier reference signal 72. The input color signal portion 102 is analog multiplied by the cosine of subcarrier reference signal 72 to produce blue analog video signal 32 using a multiplier 162. Further, the input color signal portion 102 is analog multiplied by the sine of subcarrier reference signal 72 to produce red analog video signal 30 using multiplier 164. Low-pass filters 158 and 160 following analog multipliers 162 and 164 remove any high frequency, demodulation artifacts.

As described, the extender in accordance with one embodiment of the present invention encodes separate red, blue and green video signals and associated horizontal and vertical sync signal into one enhanced signal. The enhanced signal can be transmitted on, for example, a single coaxial cable so that an extended transmission medium between a computer system and a plurality of computer monitors can be easily implemented. The extender further decodes the enhanced signal back into separate red, blue and green video signals and associated horizontal and vertical sync signals.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although in the illustrated embodiments the encoder is located outside of the computer system, the encoder can be coupled to the graphics display controller within the computer system or integrated into any part of the computer system.

What is claimed is:

1. An extender for a computer system, wherein said computer system outputs red, blue and green signals, and vertical and horizontal sync signals, said extender comprising:

an encoder coupled to said computer system, wherein said encoder generates an enhanced video signal comprising a green portion and a color portion, said encoder comprising:

a subcarrier reference oscillator circuit that receives said vertical and horizontal sync signals, wherein said subcarrier reference oscillator circuit generates a first subcarrier reference frequency;

a first adder coupled to said subcarrier reference oscillator circuit that receives said green signal and generates said green portion; and a quadrature amplitude modulation (QAM) circuit that receives said first subcarrier reference frequency and said red and blue signals and generates said color portion.

2. The extender of claim 1, further comprising:

a transmission medium coupled to said encoder; and a decoder coupled to said transmission medium.

3. The extender of claim 2, wherein said transmission medium is a coaxial cable.

4. The extender of claim 1, wherein said encoder further comprises a second adder coupled to said first adder and said QAM circuit, said second adder receiving said green portion and said color portion and generating said enhanced video signal.

5. The extender of claim 1, wherein said green portion comprises:

said horizontal and vertical sync signals;

said green signal; and said first subcarrier reference frequency.

6. The extender of claim 1, wherein said subcarrier reference oscillator circuit comprises:

a phase-locked loop;

a sync frequency measurement circuit coupled to said phase-locked loop; and a divisor table coupled to said sync frequency measurement circuit.

7. The extender of claim 1, wherein said QAM circuit comprises:

a first multiplier that receives a cosine of said first subcarrier reference frequency and said blue signal; and a second multiplier that receives a sine of said second subcarrier reference frequency and said red signal.

8. The extender of claim 2, wherein said decoder comprises:

a gated phase-locked loop that outputs a second subcarrier reference signal;

a high pass filter that removes said green portion from said enhanced video signal;

a low pass filter that removes said color portion from said enhanced video signal;

a QAM demodulation circuit coupled to said high-pass filter and said low pass filter and that receives said second subcarrier reference signal, said QAM demodulation circuit generating a second blue signal and a second red signal.

9. A method of extending the transmission distance of red, blue and green signals, and vertical and horizontal sync signals, said method comprising:

(a) generating a subcarrier reference frequency signal from said vertical and horizontal sync signals;

(b) combining said subcarrier reference frequency signal with said vertical and horizontal sync signals and said green signal to generate a green portion;

(c) quadrature amplitude modulating said blue signal and said red signal by said subcarrier reference frequency signal to generate a color portion; and (d) combining said green portion and said color portion to generate an enhanced video signal.

10. The method of claim 9, further comprising transmitting said enhanced video signal on a transmission medium.

11. The method of claim 9, wherein said red, blue and green signals, and said vertical and horizontal sync signals are generated by a computer graphics display controller.

12. The method of claim 9, wherein said red, blue and green signals, and said vertical and horizontal sync signals are generated by a high-definition television display generator.

13. The method of claim 10, further comprising:

(e) receiving said enhanced video signal on said transmission medium;

(f) outputting a second subcarrier reference signal from said enhanced video signal;

(g) removing said green portion from said enhanced video signal;

(h) removing said color portion from said enhanced signal; and (I) quadrature amplitude demodulating said color portion by said second subcarrier reference signal to generate a second blue signal and a second red signal.

14. The method of claim 13, further comprising:

extracting a second green signal, a second horizontal sync signal and a second vertical sync signal from said green portion.

15. An extender that transmits red, blue and green signals, and vertical and horizontal sync signals over a single transmission medium, said extender comprising:

an encoder coupled to the red, blue and green signals, and the vertical and horizontal sync signals, and the transmission medium; and a decoder coupled to the transmission medium;

wherein said encoder comprises:

a subcarrier reference oscillator coupled to said vertical and horizontal sync signals;

a first adder coupled to said green signal and said subcarrier reference oscillator;

a first mixer coupled to said red signal;

a second mixer coupled to said blue signal; and a second adder coupled to said first and second mixer and said first adder.

16. The extender of claim 15, wherein said subcarrier reference oscillator outputs a first subcarrier reference frequency.

17. The extender of claim 16, wherein said first mixer is coupled to a sine of said subcarrier reference frequency and said second mixer is coupled to a cosine of said subcarrier reference frequency.

18. The extender of claim 15, wherein said subcarrier reference oscillator circuit comprises:

a phase-locked loop;

a sync frequency measurement circuit coupled to said phase-locked loop; and a divisor table coupled to said sync frequency measurement circuit.

19. The extender of claim 16, wherein said encoder outputs an enhanced video signal that is transmitted over said transmission medium.

20. The extender of claim 19, wherein said decoder comprises:

a gated phase-locked loop that outputs a second subcarrier reference signal;

a high pass filter that removes a green portion from said enhanced signal;

a low pass filter that removes a color portion from said enhanced signal; and a QAM demodulation circuit coupled to said high-pass filter and said low pass filter and that receives said second subcarrier reference signal, said QAM demodulation circuit generating a second blue signal and a second red signal.

21. The extender of claim 20, wherein said green portion comprises:

said horizontal and vertical sync signals;

said green signal; and said first subcarrier reference frequency.

22. The extender of claim 20, wherein said color portion comprises said blue signal and said red signal.

23. A computer system comprising:

a bus;

a processor coupled to said bus;

a graphics display controller coupled to said bus, wherein said graphics display controller generates red, blue and green signals, and vertical and horizontal sync signals;

an encoder coupled to said graphics display controller, wherein said encoder generates an enhanced video signal comprising a green portion and a color portion, said encoder comprising:

a subcarrier reference oscillator circuit that receives said vertical and horizontal sync signals, wherein said subcarrier reference oscillator circuit generates a subcarrier reference frequency;

a first adder coupled to said subcarrier reference oscillator circuit that receives said green signal and generates said green portion; and a quadrature amplitude modulation (QAM) circuit that receives said subcarrier reference frequency and said red and blue signals and generates said color portion.

* * * * *